Oct. 15, 1957  J. D. RATJE  2,809,884
APPARATUS FOR SEPARATION BY CRYSTALLIZATION
Filed Sept. 16, 1954

INVENTOR.
J. D. RATJE
BY Hudson and Young
ATTORNEYS

United States Patent Office 2,809,884
Patented Oct. 15, 1957

2,809,884

APPARATUS FOR SEPARATION BY CRYSTALLIZATION

John D. Ratje, Borger, Tex., assignor to Phillips Petroleum Company, a corporation of Delaware Application September 16, 1954, Serial No. 456,562

13 Claims. (Cl. 23—273)

This invention relates to separation by crystallization. In one of its more specific aspects, the invention relates to improved apparatus for the separation of components of mixtures by fractional crystallization. In another of its more specific aspects, the invention relates to an improved method for separating the components of mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required.

Methods of separating a pure component from a mixture have been devised, whereby the mixture to be separated is introduced into a heat exchange zone wherein a slurry of crystals is formed and that slurry of crystals is then introduced into a purification chamber through which the crystals are moved as a compact mass. As disclosed by J. Schmidt, Re. 23,810, the crystals are moved through the chamber to a melting zone wherein the crystals are melted.

A portion of the melt is displaced countercurrently through at least a portion of the crystal mass so as to displace occluded impurities from the crystal mass approaching the melting zone. The exact mechanism whereby this displaced liquid corresponding to the melt improves the purity of the final product is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of occluded impurities and the resulting product which is removed from the melting zone is of extremely high purity. It is desirable for best operation of such a purification system to remove as much of the unfrozen material (mother liquor) from the crystals as possible prior to introducing the crystals into the purification chamber. In this manner, many of the impurities can be eliminated from the purification system before subjecting the crystals to the final purification step. Furthermore, when crystals are introduced into the purification chamber at too low a temperature, the pure melt material, when forced into the crystal plug, freezes in such a manner that the crystal mass becomes impervious. By my system, I not only provide the crystals to the purification chamber at a temperature at which no undue freezing of the pure product is encountered during the reflux, but I also remove a very large amount of the mother liquor from the crystals prior to the introduction of those crystals into the purification chamber.

In order to separate the constituents of certain mixtures by fractional crystallization, it is necessary to adjust the temperature of the mixture to one which is far below the temperature at which crystals form of any one of the pure constituents. For example, when para-xylene is separated from a mixture of isomeric $C_8$ alkyl benzenes, it is necessary to cool the mixture to a temperature in the neighborhood of about $-57°$ to about $-78°$ C.

When the crystals of para-xylene are introduced into a purification chamber wherein they are compacted and moved through the length of the column to a melt zone in a manner so as to displace a portion of the melt through at least a portion of the crystal mass, considerable difficulty is encountered. The substantially pure material obtained by melting crystals in the melt zone has, in many instances, such as in the case of para-xylene, a freezing point which is much higher than that of the desired material in admixture with the other liquid components. For example, pure para-xylene has a freezing point of about 13° C. When such a high freezing point material is displaced through at least a portion of a crystal mass which is at a temperature much lower than the freezing point of that material, that relatively pure material freezes in the interstices of the crystal mass to such an extent that it completely closes off further flow of the melt through the compacted crystal mass. I have devised a method whereby continuous operation can be achieved at a high rate without encountering freezing of a solid impervious crystal plug in the purification column. This problem is, to my knowledge, only encountered in a system using a purification tube, such as is described hereinafter. This improvement is particularly important since it results in a convenient recovery of a product of high purity at a very high rate.

By the method of my invention, a product which has better than 98 percent purity, and in some cases even as high as 99.9 percent purity, is obtained with very high continuous yields.

The following are objects of the invention.

An object of the invention is to provide an improved system for the separation of a pure component from liquid mixtures. Another object of the invention is to provide means for providing a substantially smooth chamber wall in a purification chamber. Another object of the invention is to provide an improved process for the separation of a pure component from a liquid mixture. Another object is to provide improved means for feeding crystals to a purification chamber. Another object of the invention is to provide a method for rapidly separating a component having a relatively high solidification point from a mixture which has a relatively low eutectic solidification point. Another object of the invention is to provide a process which will permit the removal of occluded impurities from crystals of otherwise high purity. Another object of the invention is to provide improved apparatus for heating the crystals and separating mother liquor therefrom prior to the introduction of the crystals into the purification chamber. Other and further objects of the invention will be apparent to those skilled in the art upon study of the accompanying disclosure.

Broadly speaking, this invention resides in an improved means and method for feeding crystals to a purification chamber. This means and method can be operated so as to provide a flexible process. In one method of operation, a piston, conforming in contour to the side wall of the purification chamber, is used to move a preferably uncompacted mass of crystals into the purification chamber and then forms a portion of the purification chamber wall. By operation in this manner, the piston in the purification chamber is not forced to shear a dense mass of crystals at the inlet to the purification chamber. In another mode of operation, the crystals are compacted by moving a mass of crystals against the side of the piston moving in the elongated purification chamber with a piston such as is described above. By using the piston having a face corresponding in contour to the side of the piston in the elongated purification chamber, I am able to exert a uniform pressure on all portions of the crystal mass being compacted, thus uniformly removing liquid therefrom by compression rather than compressing a portion of the mass to a higher degree than other portions thereof, thereby moving liquid from the more compressed portion to the less compressed portion. Liquid material which is removed from the crystal mass by compression is removed from the compression chamber either through a perforated face of the piston or through a separate filter in the compression chamber if the piston is of the imperforate type.

Although, as I have pointed out hereinbefore, this invention is particularly applicable to systems in which the temperature of the crystal feed to the purification zone is considerably higher than the temperature to which the feed mixture is cooled to form crystals of the desired component, the method and apparatus of this invention can be advantageously utilized in practically any system to which fractional crystallization is applicable. This invention is applicable to separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say, 15 to 25 percent purity, so as to effect a purity upwards of 98 percent. In order to illustrate some of the systems to which the invention is applicable, the following compounds are grouped with respect to their boiling points.

| Group A | B. P., °C. | F. P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B. P., °C. | F. P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B. P., °C. | F. P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B. P., °C. | F. P., °C. |
|---|---|---|
| Aniline | 184.4 | −6.2 |
| Toluene | 110.8 | −95 |
| Benzene | 80.0 | 5.5 |

| Group E | B. P., °C. | F. P., °C. |
|---|---|---|
| Carbon tetrachloride | 77 | −22.8 |
| Chloroform | 61 | −63.5 |
| $CS_2$ | 46.3 | −108.6 |
| Acetone | 56.5 | −95 |

| Group F | B. P., °C. | F. P., °C. |
|---|---|---|
| Ortho-xylene | 144 | −27.1 |
| Meta-xylene | 138.8 | −47.4 |
| Para-xylene | 138.5 | 13.2 |

| Group G | B. P., °C. | F. P., °C. |
|---|---|---|
| Ortho-cymene | 175.0 | −73.5 |
| Meta-cymene | 175.7 | <−25 |
| Para-cymene | 176.0 | −73.5 |

| Group H | B. P., °C. | M. P., °C. |
| --- | --- | --- |
| Dimethyl phthalate | 282 | 5.5 |
| Dimethyl isophthalate | 124 (12 mm.) | 67 |
| Dimethyl terephthalate | 288 | 140.6 |

| Group I | B. P., °C. | M. P., °C. |
| --- | --- | --- |
| Ortho-nitrotoluene | 222.3 | α—10.6 / β—4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene, n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), para-cresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawings in which.

Figure 1:
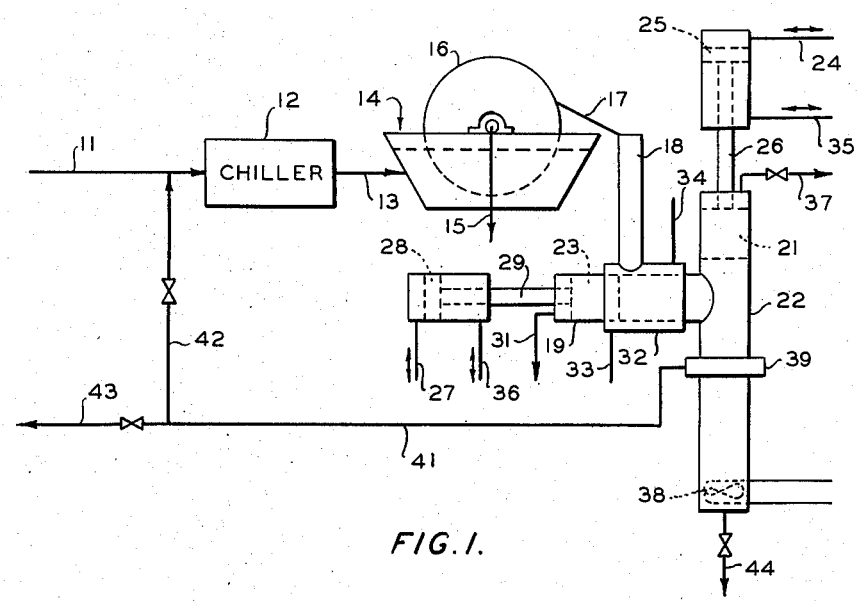
Figure 1 is a schematic representation of the fractional crystallization system of this invention.

Referring to Figure 1 of the drawings, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type, which is supplied with refrigeration means that are adequate to adjust the temperature of the mixture to that necessary to obtain crystals of at least a portion of at least one of the constituents thereof. As will be apparent from the discussion hereinabove, the temperature to which the mixture is adjusted in the heat exchanger will depend entirely upon the specific mixture, since the various materials have different solidification points and the solidification point of any given constituent of a mixture is dependent upon the constitution of the mixture. When, for example, a mixture of isomeric $C_8$ alkyl benzenes is fed through conduit 11 to chiller 12, that mixture is lowered to a temperature in the neighborhood of —57° to —78° C. When the desired product is relatively dilute in the feed stream, the temperature at which crystals will form will be relatively low. If the desired product is relatively concentrated in the feed, the temperature at which crystals will form will be relatively high.

The slurry resulting from chilling of the mixture is passed through conduit 13 to filter 14 wherein the non-crystalline material is separated from the crystals. The amount of non-crystalline material (mother liquor) which is separated from the crystals and removed through conduits 15 is dependent, to a considerable extent, upon the specific type of filter which is utilized. For illustration, a rotary filter is shown wherein the slurry is maintained as a body in which the lower portion of drum 16 is rotated so that crystals are deposited on drum 16 as it is rotated, mother liquor being withdrawn from those crystals and being removed through conduit 15, and the crystals being scraped from drum 16 by scraper 17. However, any one of several different types of filters can be used for this step in my process. Higher speed types, such as a centrifuge, can be utilized, or a pressure type filter in which crystals are partially compacted by some compacting means, such as an auger or a piston, can be used. Crystals are removed from filter 14 by scraper 17 and are passed through conduit 18 to chamber 19.

The crystalline material which is introduced into chamber 19 is, in one aspect of the invention, moved through chamber 19 directly into the upstream portion of purification chamber 22 by piston 23. In this specific operation, piston 23 is moved forward by fluid flow through conduit 27 acting against piston 28 connected to piston 23 by piston rod 29, to such an extent that its curved face coincides with the curved side of purification chamber 22 so as to fill in the openings from chamber 19 and form a substantially smooth wall of chamber 22 through which piston 21 in chamber 22 moves the crystal mass in a downstream direction. By operating in this fashion, I have been able to overcome one of the problems of such a piston type purification chamber in that crystals which are moved into the purification chamber are not compacted into a dense mass in such fashion that the piston 21 moving through purification chamber 22 is required to shear that dense mass in the inlet to the purification chamber.

In another method of operation of the system of this invention, the crystalline material which is introduced into chamber 19 is compacted against the wall of piston 21 in purification chamber 22 when that piston is in an extended position. As pointed out above, piston 23 is provided with a face which corresponds to the contour of the side wall of chamber 22 and, thus, also conforms to the side of piston 21. Thus, although I may encounter one difficulty which is avoided by the other method of operation, i. e., that of having to shear a dense mass of crystals at the inlet to the purification chamber by reason of the fact that the crystals are first compacted before they are introduced into that chamber, I obtain another advantage by this specific method of operation. The crystals are compacted in chamber 19 by means of piston 23 into a mass of uniform solids content in any given cross-section, since the piston which is utilized to compact the crystals has a face which corresponds to the side contour of piston 21 against which the crystals are compacted. Since the crystal mass is uniformly compact, liquid material is uniformly removed from that mass during the compacting. In the device shown as Figure 1 of the drawings, liquid material which is removed from the crystal mass within chamber 19 is removed through the porous face of piston 23 and is removed from chamber 19 through conduit 31.

In either method of operation, it is desirable to supply the crystals to purification chamber 22 at a temperature which is sufficiently high to prevent freezing of the crystal mass to an impervious plug. For this reason, heating material is passed through heating jacket 32 by means of conduits 33 and 34. During this heating, some of the crystals will be melted. When the crystals are compacted in chamber 19, at least a portion of the melt is removed as a result of the compacting.

In the method wherein the crystals are compacted within chamber 19, as piston 21 is withdrawn by means of fluid flowing through conduit 35 and acting against piston 25, which is connected to piston 21 by piston rod 26, the crystal mass which has been compacted in chamber 19 is moved into chamber 22 by means of piston 23. Piston 21 is then once again moved in a downstream direction by flow of fluid through conduit 24 and against piston 25 and piston 23 is retracted by the action of fluid passing through conduit 36 and acts against piston 28. In most instances, as the crystal mass is moved through chamber 22 by piston 21, it will not be necessary to remove liquid through piston 21 and through conduit 37. Thus, it is usually preferred to utilize a piston 21 which has an imperforate face.

After the crystals have been introduced into chamber 22 by either method described above, the crystals are moved through chamber 22 as a compact mass in a downstream direction to a melting zone in heat exchange relation with heating element 38 where a portion of the crystals are melted. Heating element 38 may be any type of heating device, such as heating coils through which heat exchange fluid is passed, such as the device shown in the drawings, or may be a heating element positioned about the lower portion of chamber 22 or may be an electrical heating element provided within or without chamber 22. A portion of the melt is displaced upstream countercurrently to the movement of the crystals and through at least a portion of the crystal mass so as to displace impurities from the crystal mass. The impurities which are displaced from the crystal mass are removed through filter 39 and conduit 41. Under some conditions of operation, the concentration of material corresponding to the purified material in the stream removed through conduit 41 is higher than its concentration in the feed, in which case the stream is passed by means of conduit 42 to chiller 12, wherein it is utilized to enrich the feed stream from conduit 11, thereby resulting in the formation of larger crystals than can be formed from the mixture containing a lower concentration of the desired component. If the concentration of the desired component in the stream removed from conduit 41 is relatively low, that liquid is removed from the system through conduit 43 and may be disposed of as desired. Purified product is removed from chamber 22 through conduit 44.

Figure 2:
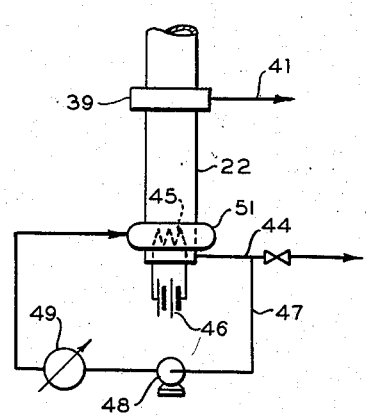
Figure 2 is a modification of the lower portion of the purification chamber of Figure 1.
Figure 3:
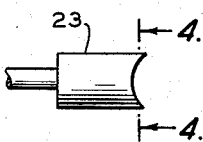
Figure 3 is a top view of a piston used in compacting crystals prior to their movement into the purification chamber.

Referring particularly to the device shown in Figure 2 of the drawings, the lower downstream portion of chamber 22 is modified so as to provide a heating means, such as electrical heating element 45 connected to a power source 46. Furthermore, a portion of the purified product which is removed from conduit 44 is passed by means of conduit 47 and pump 48 through heat exchanger 49 where the melt is raised to a temperature above the melting point of the crystals and that portion of the pure material is introduced into the downstream portion of chamber 22 through header 51. It is preferred that heating by means of a heated portion of the purified product be carried out in conjunction with other heating, such as by heating elements 38 or 45 or another type of heating element discussed above in connection with Figure 1.

Figure 4:
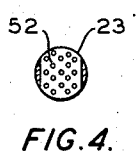
Figure 4 is a cross-section taken on the line 4—4 of Figure 3.

In one modification shown in Figure 4, piston 23 is provided at its face with perforations 52 which are large enough to permit the flow of liquid therethrough but which are small enough to prevent the movement of crystals therethrough.

Figure 5:
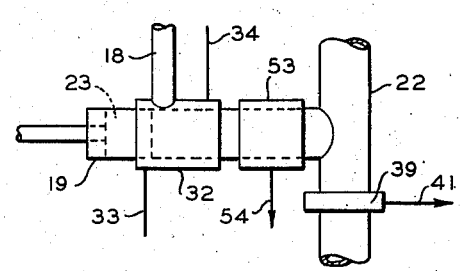
Figure 5 is a section showing a modified compacting chamber of Figure 1 wherein an imperforate piston is used.

Referring to Figure 5 of the drawings, compacting chamber 19 is provided with piston 23 which compacts crystals introduced through conduit 18. The crystals are heated by heating fluid passed through heating jacket 32, as discussed in connection with Figure 1 of the drawings. Piston 23 in the device shown in this figure of the drawings has an imperforate face and, for that reason, it is necessary to provide filter 53 in the wall of chamber 19 adjacent chamber 22. Liquid material which is excluded from the crystal mass by compression in chamber 19 is removed from filter 53 by means of conduit 54.

In order to better illustrate my invention, I have provided the following example which is intended to exemplify but not to unduly restrict my invention.

*Example*

A feed mixture comprising 17 percent by weight para-xylene, 17.5 percent by weight ortho-xylene, 33.4 percent by weight meta-xylene, 27.5 percent by weight ethyl benzene and 4.6 percent by weight toluene is supplied to the system at the rate of 1000 gallons per hour through conduit 11. Liquid material recovered as displaced liquid from chamber 23 to filter 39 comprises 53.1 percent para-xylene, 9.8 percent ortho-xylene, 18.7 percent meta-xylene, 15.6 percent ethyl benzene and 2.8 percent toluene. This stream is supplied to chiller 12 at 165 gallons per hour, together with the feed stream described hereinabove, the resulting composite feed comprising 22.1 percent para-xylene, 16.3 percent ortho-xylene, 31 percent meta-xylene, 26.2 percent ethyl benzene and 4.4 percent toluene at 1165 gallons per hour. That material is cooled to a temperature of $-76°$ C. with the resultant formation of 15.1 percent solids. The slurry of mother liquor and crystals is passed to filter 14 wherein mother liquor having a para-xylene content of 6.75 percent is removed at a rate of 890 gallons per hour through conduit 15. The crystal material from which the mother liquor has been removed is 70 percent solids and is at a temperature of $-76°$ C. That material is supplied to compacting chamber 19 wherein the crystal mass is further compressed while being heated to a temperature of $-23°$ C. and a stream of 40 percent solids at that temperature is moved to purification column 22 at a rate of 275 gallons per hour. The crystals are compacted in column 22 and are moved as a compact mass downstream to the heating zone wherein the crystals are melted and a portion of the melt is displaced upstream through the compact crystal mass. A product which is about 99 percent para-xylene is removed through conduit 44 at a rate of 110 gallons per hour.

It will be apparent to those skilled in the art that various modifications of this invention can be made upon study of the accompanying disclosure. Such modifications are believed to be clearly within the spirit and the scope of this invention.

I claim:

1. In apparatus wherein a piston is utilized to move crystals through an elongated crystal purification chamber, the improvement which comprises an elongated side chamber affixed to an upstream portion of said purification chamber; crystal inlet means in said side chamber; liquid outlet means from said side chamber; and a piston for compacting crystals in said side chamber against the wall of the piston in said purification chamber, the face of the piston in said side chamber corresponding in contour to the side of the piston in said purification chamber.

2. In apparatus wherein a piston is utilized to move crystals through an elongated crystal purification chamber, the improvement which comprises an elongated side chamber affixed to an upstream portion of said purification chamber; crystal inlet means in said side chamber; heating means operatively connected to said side chamber; liquid outlet means from said side chamber; and a piston for compacting crystals in said side chamber against the wall of the piston in said purification chamber, the face of the piston in said side chamber corresponding in contour to the side of the piston in said purification chamber.

3. In apparatus wherein a piston is utilized to move crystals through an elongated crystal purification chamber, the improvement which comprises an elongated side chamber affixed to an upstream portion of said purification chamber; crystal inlet means in said side chamber; a piston for compacting crystals in said side chamber against the wall of the piston in said purification chamber, the face of the piston in said side chamber corresponding in contour to the side of the piston in said purification chamber and being perforate so as to permit the flow of liquid therethrough but so as to prevent the movement of crystals therethrough; and liquid outlet means in said side chamber for removing liquid which passes through the perforate face of said piston from said side chamber.

4. In apparatus wherein a piston is utilized to move crystals through an elongated crystal purification chamber, the improvement which comprises an elongated side chamber affixed to an upstream portion of said purification chamber; crystal inlet means in said side chamber; liquid outlet means from said side chamber; and an imperforate piston for moving crystals in said side chamber into said purification chamber, the face of the piston in said side chamber corresponding in contour to the side of the piston in said purification chamber.

5. In apparatus wherein a piston is utilized to move crystals through an elongated crystal purification chamber, the improvement which comprises an elongated side chamber affixed to an upstream portion of said purification chamber; crystal inlet means in said side chamber; liquid outlet means from said side chamber; and an imperforate piston for compacting crystals in said side chamber against the wall of the piston in said purification chamber, and adapted to form a portion of the wall of said purification chamber, the face of the piston in said side chamber corresponding in contour to the side of the piston in said purification chamber.

6. In apparatus wherein a piston is utilized to move crystals through an elongated crystal purification chamber, the improvement which comprises an elongated side chamber affixed to an upstream portion of said purification chamber; a piston in an upstream portion of said side chamber for compacting crystals in said side chamber against the wall of the piston in said purification chamber, the face of the piston in said side chamber corresponding in contour to the side of the piston in said purification chamber; crystal inlet means in said side chamber downstream of said piston in its retracted position; heating means operatively connected to said side chamber; and filter means in said side chamber intermediate said heating means and said purification chamber.

7. Apparatus for purification of crystals by fractional crystallization which comprises, a heat exchanger for adjusting the temperature of a mixture so as to form crystals of a component thereof; feed inlet means to said heat exchanger; separation means for separating crystalline and non-crystalline material; means for transferring a slurry of crystalline and non-crystalline material from said heat exchange means to said separation means; conduit means for removing non-crystalline material from said separation means; a first closed elongated chamber; means for transferring crystals from said separation means to said first chamber; heating means operatively connected to said first chamber; a second closed elongated chamber affixed at an upstream portion to the downstream end of said first chamber; a piston slidably fitted in an upstream portion of said second chamber and adapted to be moved through at least an upstream portion of said second chamber; a piston slidably fitted in said first chamber and adapted to be moved through at least an upstream portion of said first chamber, said piston having a face corresponding in contour to the wall of said piston in said second chamber; heating means in a downstream portion of said second chamber; filter means in said second chamber upstream of said heating means; and means for removing purified product from a downstream portion of said second chamber.

8. Apparatus for purification of crystals by fractional crystallization which comprises, a heat exchanger for adjusting the temperature of a mixture so as to form crystals of a component thereof; feed inlet means to said heat exchanger; separation means for separating crystalline and non-crystalline material; means for transferring a slurry of crystalline and non-crystalline material from said heat exchange means to said separation means; conduit means for removing non-crystalline material from said separation means; a first closed elongated chamber; means for transferring crystals from said separation means to said first chamber; heating means operatively connected to said first chamber; a second closed elongated chamber affixed at an upstream portion to the downstream end of said first chamber; a piston slidably fitted in an upstream portion of said second chamber and adapted to be moved through at least an upstream portion of said second chamber and across the downstream end of said first chamber; a piston slidably fitted in said first chamber and adapted to be moved through at least an upstream portion of said first chamber, said piston having a face corresponding in contour to the wall of said piston in said second chamber; means for removing liquid from said first chamber; heating means in a downstream portion of said second chamber; filter means in said second chamber upstream of said heating means; and means for removing purified product from a downstream portion of said second chamber.

9. Apparatus for purification of crystals by fractional crystallization which comprises, a heat exchanger for adjusting the temperature of a mixture so as to form crystals of a component thereof; feed inlet means to said heat exchanger; separation means for separating crystalline and non-crystalline material; means for transferring a slurry of crystalline and non-crystalline material from said heat exchange means to said separation means; conduit means for removing non-crystalline material from said separation means; a first closed elongated chamber; means for transferring crystals from said separation means to said first chamber; heating means operatively connected to said first chamber; a second closed elongated chamber affixed at an upstream portion to the downstream end of said first chamber; a piston slidably fitted in an upstream portion of said second chamber and adapted to be moved through at least an upstream portion of said second chamber and across the downstream end of said first chamber; a piston slidably fitted in said first chamber and adapted to be moved through at least an upstream portion of said first chamber, said piston having a face corresponding in contour to the wall of said piston in said second chamber; means for removing liquid from said first chamber; heating means in a downstream portion of said second chamber; filter means in said second chamber upstream of said heating means; means for removing purified product from a downstream portion of said second chamber; conduit means extending from said means for removing purified product and operatively connected to a downstream portion of said second chamber; and heating means operatively connected to said conduit means.

10. The apparatus of claim 9 wherein said heating means in a downstream portion of said second chamber comprises electrical heating means operatively connected to a power supply.

11. Apparatus for purification of crystals by fractional crystallization which comprises, a heat exchanger for adjusting the temperature of a mixture so as to form crystals of a component thereof; feed inlet means to said heat exchanger; separation means for separating crystalline and non-crystalline material; means for transferring a slurry of crystalline and non-crystalline material from said heat exchange means to said separation means; conduit means for removing non-crystalline material from said separation means; a first closed elongated chamber; means for transferring crystals from said separation means to said first chamber; heating means operatively connected to said first chamber; a second closed elongated chamber affixed at an upstream portion to the downstream end of said first chamber; a piston slidably fitted in an upstream portion of said second chamber and adapted to be moved through at least an upstream portion of said second chamber and across the downstream end of said first chamber; a piston slidably fitted in said first chamber and adapted to be moved through at least an upstream portion of said first chamber, said piston having a face corresponding in contour to the wall of said piston in said second chamber; means for removing liquid from said first chamber; heating means in a downstream portion of said second chamber; filter means in said second chamber upstream of said heating means; conduit means extending from said filter means in said second chamber to said heat exchanger; and means for removing purified product from a downstream portion of said second chamber.

12. In an apparatus for the purification of crystals comprising a first closed elongated chamber operatively connected to a second closed elongated chamber, said second closed elongated chamber affixed at an upstream portion to the downstream end of said first chamber; a piston slidably fitted in an upstream portion of said second chamber and adapted to be moved through at least an upstream portion of said second chamber and across the downstream end of said first chamber; feed inlet means to said first chamber; conduit means for removing non-crystalline material from said first chamber; heating means operatively connected to said first chamber; the improvement which comprises a piston slidably fitted in said first chamber and adapted to be moved through at least an upstream portion of said first chamber and being perforated so as to permit the flow of liquid therethrough, said last described piston having a face corresponding in contour to the wall of said second chamber.

13. An apparatus wherein a piston is utilized to move crystals through an elongated crystal purification chamber, the improvement which comprises an elongated side chamber affixed to an upstream portion of said purification chamber, crystal inlet means in said side chamber, liquid outlet means from said side chamber and a piston for moving crystals in said side chamber into said purification chamber, the face of the piston in said side chamber corresponding in contour to the side of the piston in said purification chamber.

References Cited in the file of this patent

UNITED STATES PATENTS

| | | |
|---|---|---|
| 1,890,802 | Apple | Dec. 13, 1932 |
| 2,615,793 | Weedman | Oct. 28, 1952 |
| 2,617,274 | Schmidt | Nov. 11, 1952 |
| 2,683,178 | Findlay | July 6, 1954 |